United States Patent
Havlir et al.

(10) Patent No.: US 10,593,094 B1
(45) Date of Patent: Mar. 17, 2020

(54) DISTRIBUTED COMPUTE WORK PARSER CIRCUITRY USING COMMUNICATIONS FABRIC

(71) Applicant: Apple Inc., Cupertino, CA (US)

(72) Inventors: Andrew M. Havlir, Orlando, FL (US); Benjamin Bowman, London (GB); Jeffrey T. Brady, Orlando, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/143,412

(22) Filed: Sep. 26, 2018

(51) Int. Cl.
*G06T 15/00* (2011.01)
*G06F 9/50* (2006.01)

(52) U.S. Cl.
CPC .......... *G06T 15/005* (2013.01); *G06F 9/5027* (2013.01); *G06T 2200/28* (2013.01)

(58) Field of Classification Search
CPC .. G06T 15/005; G06T 2200/28; G06F 9/5027
See application file for complete search history.

(56) References Cited

U.S. PATENT DOCUMENTS

| | | | | |
|---|---|---|---|---|
| 8,225,325 B2* | 7/2012 | Munshi | ............ | G06F 9/4843 718/104 |
| 8,707,314 B2* | 4/2014 | Gummaraju | ......... | G06F 9/5044 718/102 |
| 9,009,712 B2* | 4/2015 | Schmit | ................ | G06F 9/4881 718/102 |
| 2007/0030280 A1* | 2/2007 | Paltashev | ................ | G06T 1/20 345/506 |
| 2012/0317556 A1* | 12/2012 | Zhu | ....................... | G06F 8/451 717/146 |
| 2014/0310507 A1* | 10/2014 | Nystad | ............... | G06F 9/44521 713/1 |
| 2017/0024924 A1 | 1/2017 | Wald et al. | | |

* cited by examiner

Primary Examiner — Maurice L. McDowell, Jr.
Assistant Examiner — Donna J. Ricks
(74) *Attorney, Agent, or Firm* — Kowert, Hood, Munyon, Rankin & Goetzel, P.C.

(57) ABSTRACT

Techniques are disclosed relating to distributing work from compute kernels using a distributed hierarchical parser architecture. In some embodiments, an apparatus includes a plurality of shader units configured to perform operations for compute workgroups included in compute kernels processed by the apparatus, a plurality of distributed workload parser circuits, and a communications fabric connected to the plurality of distributed workload parser circuits and a master workload parser circuit. In some embodiments, the master workload parser circuit is configured to iteratively determine a next position in multiple dimensions for a next batch of workgroups from the kernel and send batch information to the distributed workload parser circuits via the communications fabric to assign the batch of workgroups. In some embodiments, the distributed parsers maintain coordinate information for the kernel and update the coordinate information in response to the batch information, even when the distributed parsers are not assigned to execute the batch.

20 Claims, 13 Drawing Sheets

US 10,593,094 B1

DISTRIBUTED COMPUTE WORK PARSER CIRCUITRY USING COMMUNICATIONS FABRIC

BACKGROUND

Technical Field

This disclosure relates generally to parallel processing and more particularly to distributing compute kernels to processing elements (e.g., GPU shader cores) in distributed architectures.

Description of the Related Art

Given their growing compute capabilities, graphics processing units (GPUs) are now being used extensively for large-scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations.

Compute work is often specified as kernels that are multi-dimensional aggregations of compute workgroups. For example, a program executed by a central processing unit may use one or more compute kernels that are compiled for another processor such as a GPU or digital signal processor (DSP). One common kernel organization is a three-dimensional kernel that includes a number of workgroups in each of the x, y, and z dimensions. Fetching and distributing compute work efficiently may substantially affect performance and power consumption for compute tasks.

Figure 1A:
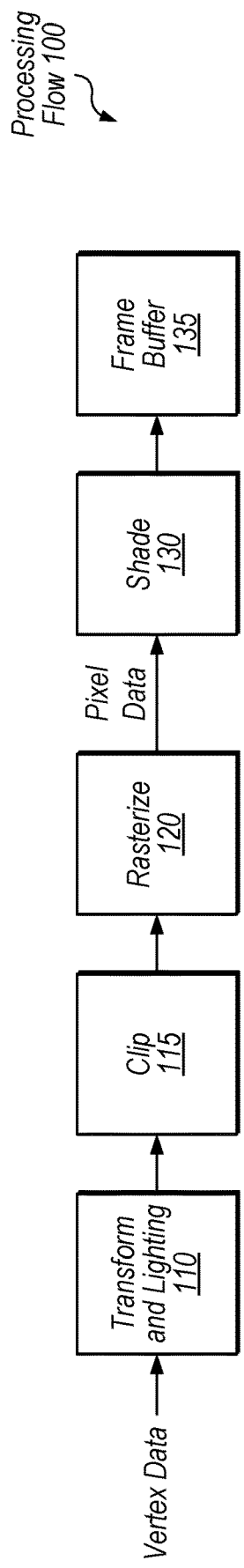
FIG. 1A is a block diagram illustrating an example graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "workload parser circuit configured to distributed batches of workgroups" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics Processing Overview

Referring to FIG. 1A, a flow diagram illustrating an example processing flow 100 for processing graphics data is shown. In some embodiments, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the example elements of FIG. 1A may be performed in various orders, performed in parallel, or omitted. Additional processing steps may also be implemented.

Figure 1B:
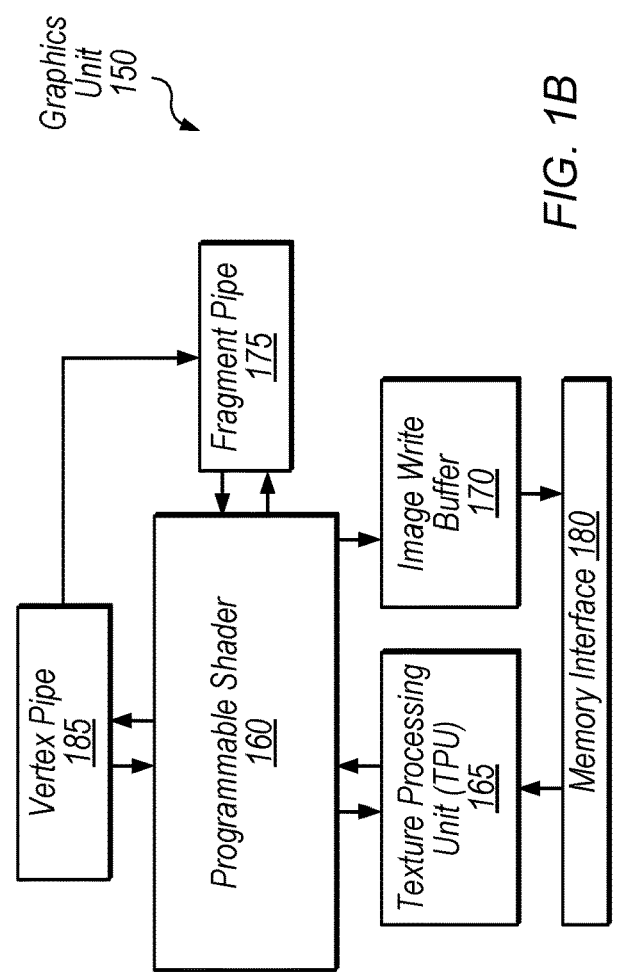
FIG. 1B is a block diagram illustrating one embodiment of a graphics unit.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The example embodiment of FIG. 1B shows one possible configuration of a graphics unit 150 for illustrative purposes.

Overview of Distribution of Workgroups from a Compute Kernel

Compute work is generally specified in kernels that are multi-dimensional structures of workitems to be performed, e.g., by a GPU. As one example, a three-dimensional kernel may have a certain number of workitems in each of the x, y, and z dimensions. Workitems may be executed similarly to graphics threads. Kernels are often compiled routines for high throughput accelerators such as GPUs or DSPs. Kernels may be specified in their own programming language (e.g., OpenCL C), managed by a graphics API such as OpenGL, or embedded directly in application code (e.g., using C++ AMP). In some embodiments, workitems are aggregated into structures called workgroups. Thus, a kernel may also have a certain number of workgroups in each of the multiple dimensions. The term "workgroup" is intended to be construed according to its well-understood meaning, which includes a portion of the operations in a compute kernel. Typically, compute work is sent to a shader core at workgroup granularity. Each workgroup may include multiple workitems. A "shader core" or "shader unit" refers to a processing element configured to execute shader programs. Typically, a GPU includes a large number of shader units for parallel processing. In addition to pixel and vertex shading programs, for example, shader cores may also be used to execute compute programs. Note that, although shader cores and GPUs are discussed herein for purposes of illustration, the disclosed techniques are not limited to graphics processors, but may be applied to various parallel processor architectures.

In some embodiments, compute workload parser circuitry may iterate through a kernel in batches. For example, the parser circuitry may generate the next coordinates for the next batch in multiple dimensions and downstream circuitry may use these dimensions to access the appropriate workgroups for execution. In some embodiments, a workgroup iterator is configured to determine coordinates for a new batch every clock cycle. In some embodiments, registers may store a limit for each of the dimensions based on the size of the kernel. For example, for a kernel that has three workgroups in the x direction, four in the y direction, and five in the z direction, these registers store corresponding values, in some embodiments (e.g., 2, 3, and 4 in embodiments that start counting at zero). In some embodiments, the limit value is used to determine when to rollover when incrementing a particular coordinate for a batch.

In some embodiments, GPUs are implemented using multiple subsets of circuitry that are coupled via a communications fabric. A "communications fabric," which may also be referred to as a "switch fabric" refers to circuitry with multiple ports that is configured to route input data at one of the ports to another one of the ports. Typically, all of the inputs of a communications fabric are connected to all of the outputs of the communications fabric. Further, switch fabrics typically include a number of physical lines connecting ports (directly or indirectly), resulting in a fabric-like appearance of the circuitry.

As one example, graphics unit 150 may include global control circuitry configured to send work to multiple programmable shaders 160 via a communications fabric. Note that the shaders may be configured to operate on multiple types of work (e.g., pixel work, vertex work, and compute work) and arbitration circuitry (not shown) may allocate a portion of available shader resources to compute work. This distributed architecture may allow efficient control with an increase in overall compute power, but may introduce challenges in efficiently distributing compute work to different shaders. For example, the distributed workload parsers may have reduced information available relative to a single centralized workload parser, but it may be desirable to avoid overburdening the communications fabric when transmitting parser information. Various techniques discussed herein facilitate efficient distribution of compute work in such distributed implementations.

Figure 2A:
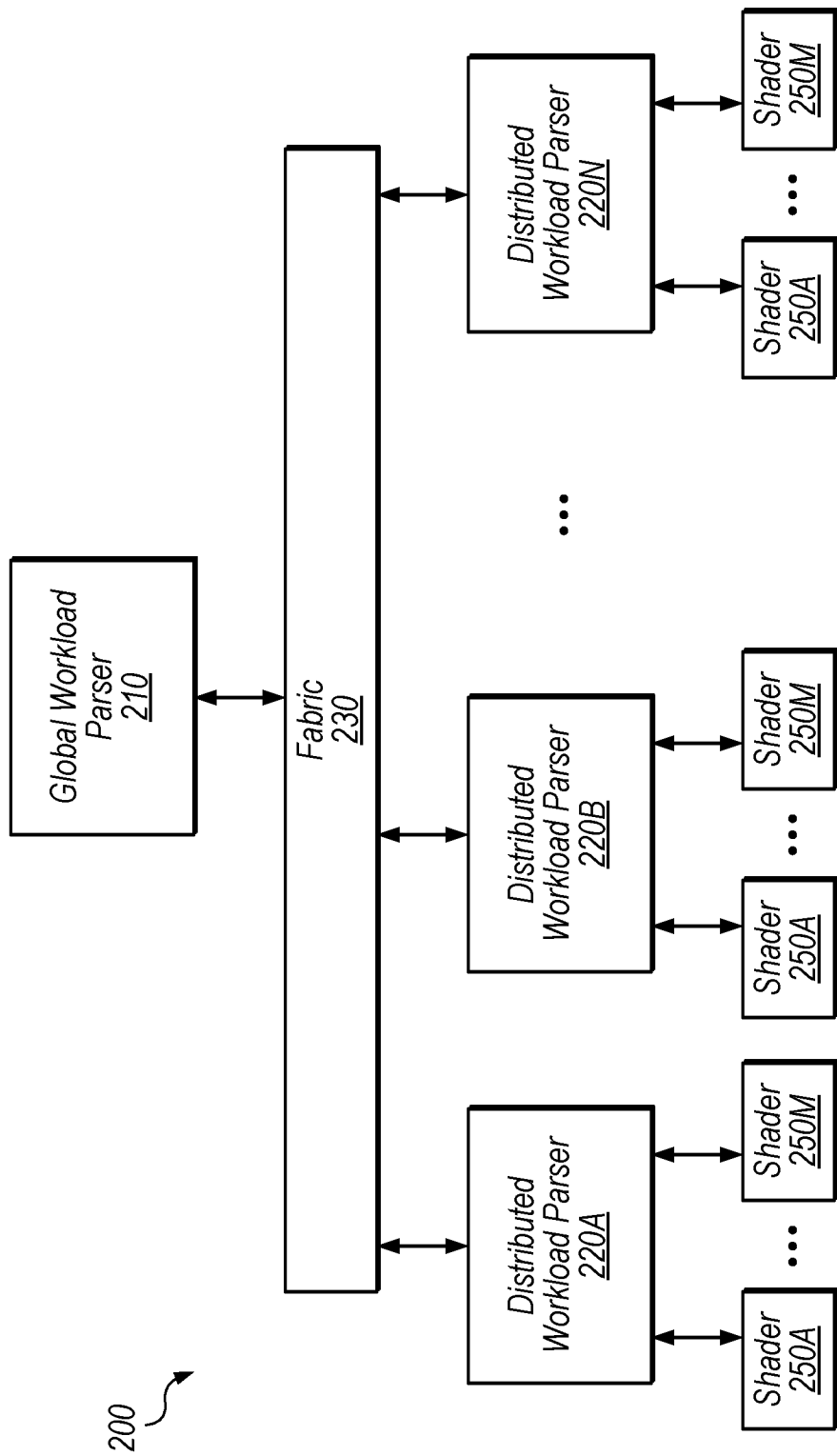
FIG. 2A is a block diagram illustrating an overview of a distributed hierarchical workload parser architecture, according to some embodiments.

FIG. 2A is a block diagram illustrating example circuitry with distributed workload parsers for different sets of shaders, according to some embodiments. In the illustrated embodiment, circuitry 200 includes global workload parser 210, distributed workload parsers 220A-N, fabric 230, and shaders 250. In some embodiments, the global workload parser is referred to as a master workload parser or master workload parser circuit. In the illustrated embodiment, the global workload parser 210 communicates with distributed workload parsers 220 via fabric 230. Each distributed workload parser 220 is configured to send compute work to the set of shaders 250 to which it is connected, in some embodiments. In some embodiments, each programmable shader 160 (or some other granularity of sub-GPU) includes a distributed workload parser 220. Parsers 210 and 220 may be included on the same integrated circuit along with fabric 230 or may be implemented on different integrated circuits.

Figure 2B:
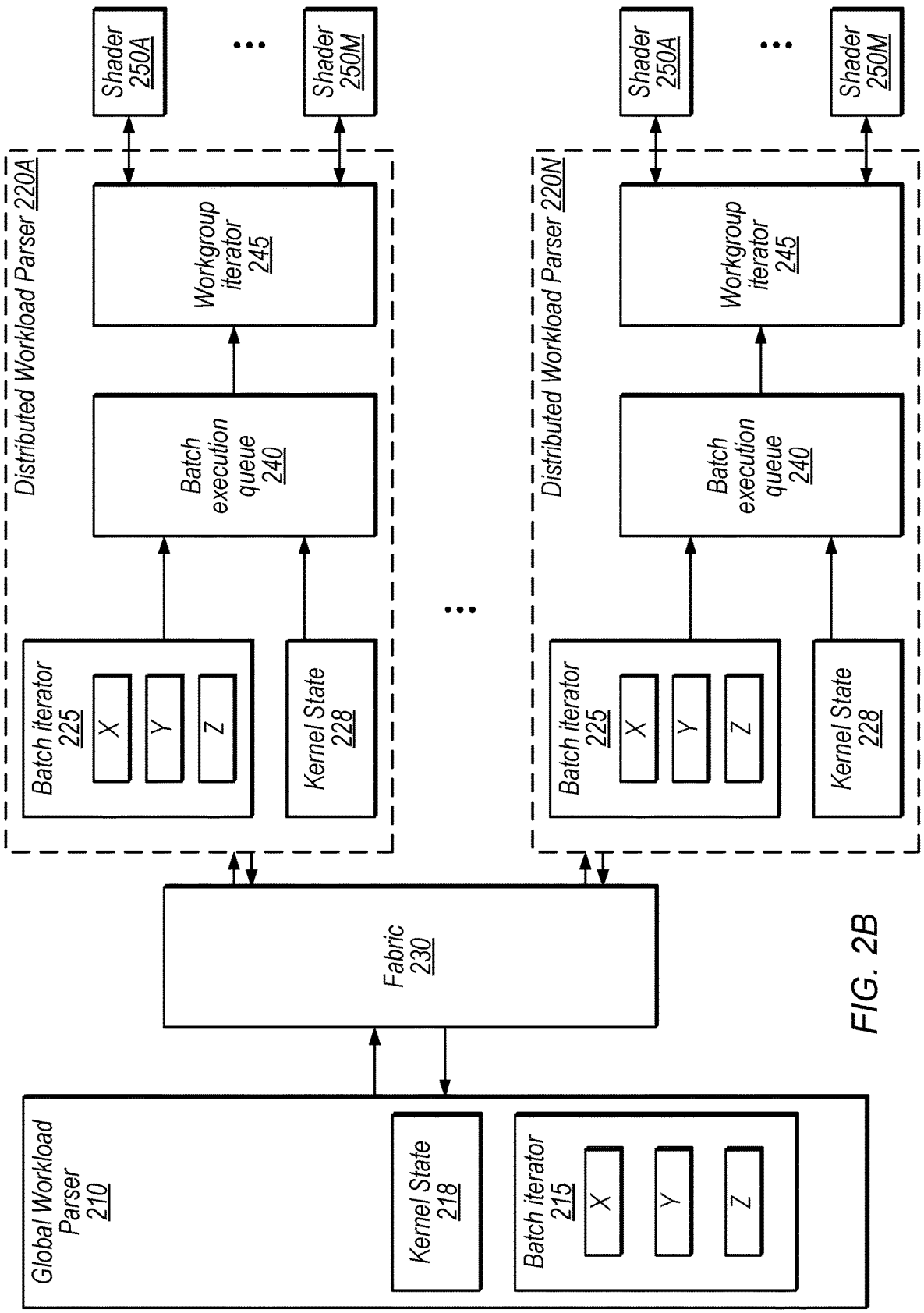
FIG. 2B is a block diagram illustrating example circuitry included in global and distributed workload parsers, according to some embodiments.
Figure 3:
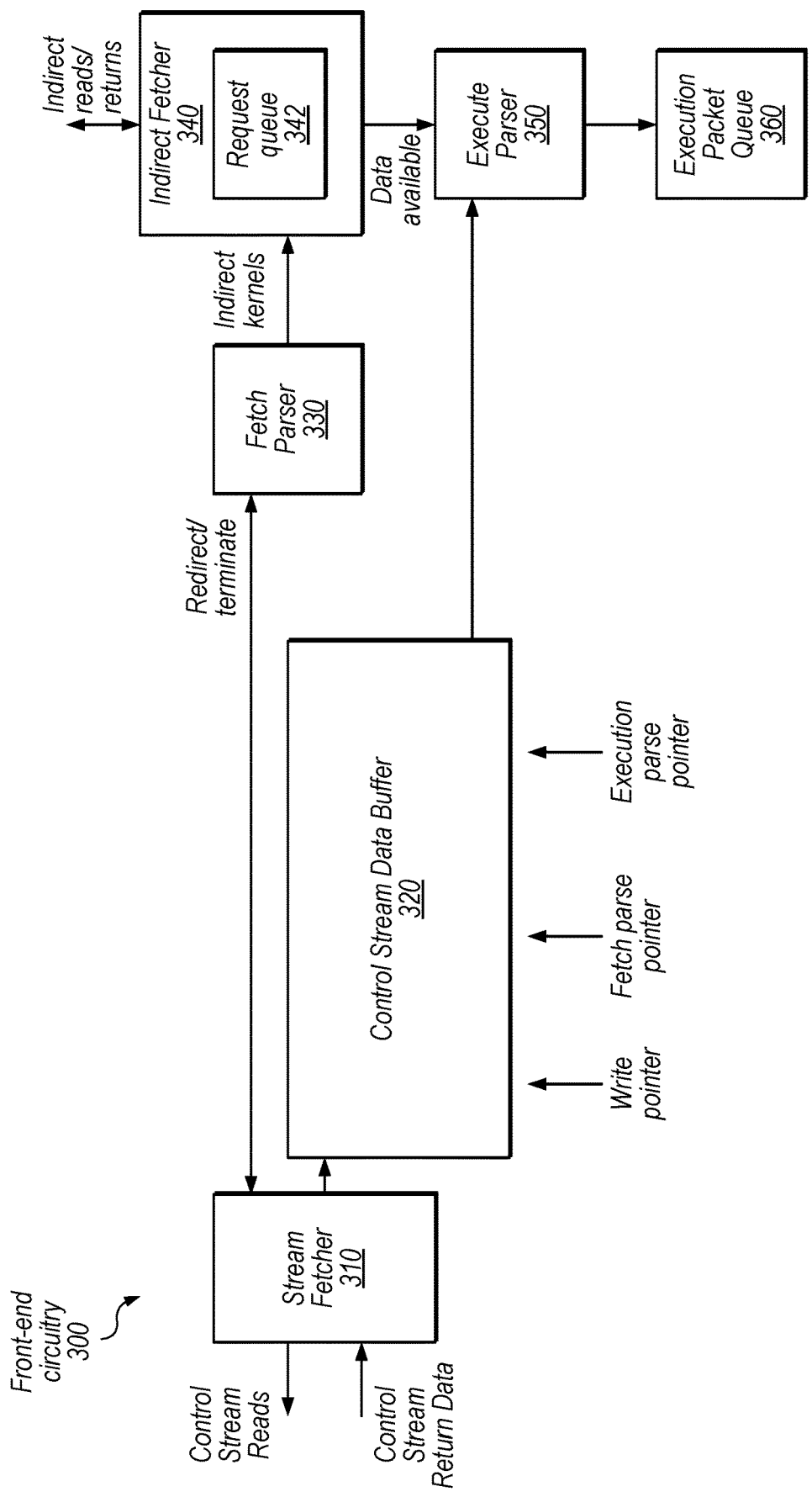
FIG. 3 is a block diagram illustrating example front-end circuitry configured to fetch kernels from a compute command stream, according to some embodiments.
Figure 4:
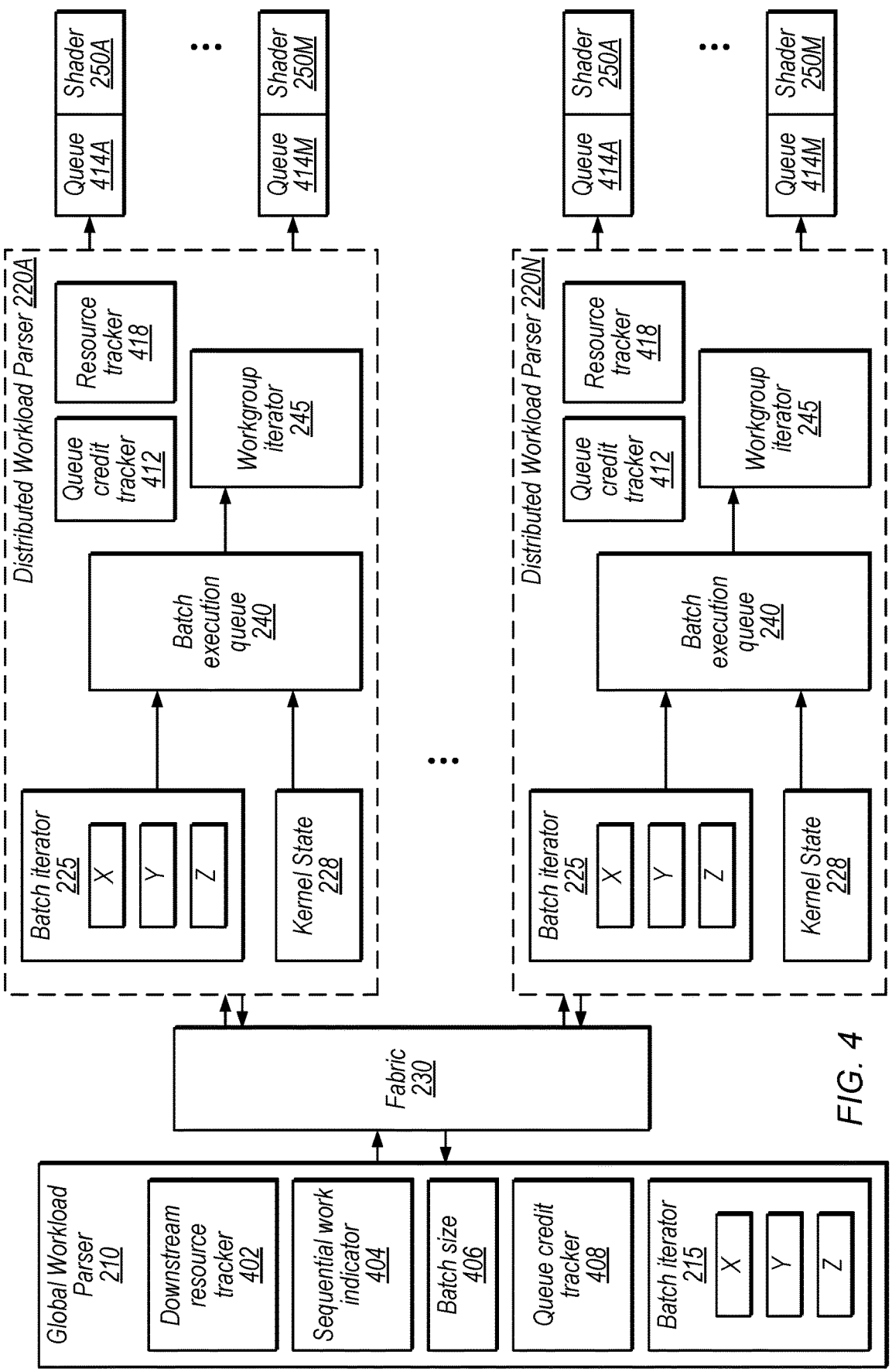
FIG. 4 is a block diagram illustrating example circuitry for load balancing in a distributed parser architecture, according to some embodiments.
Figure 5:
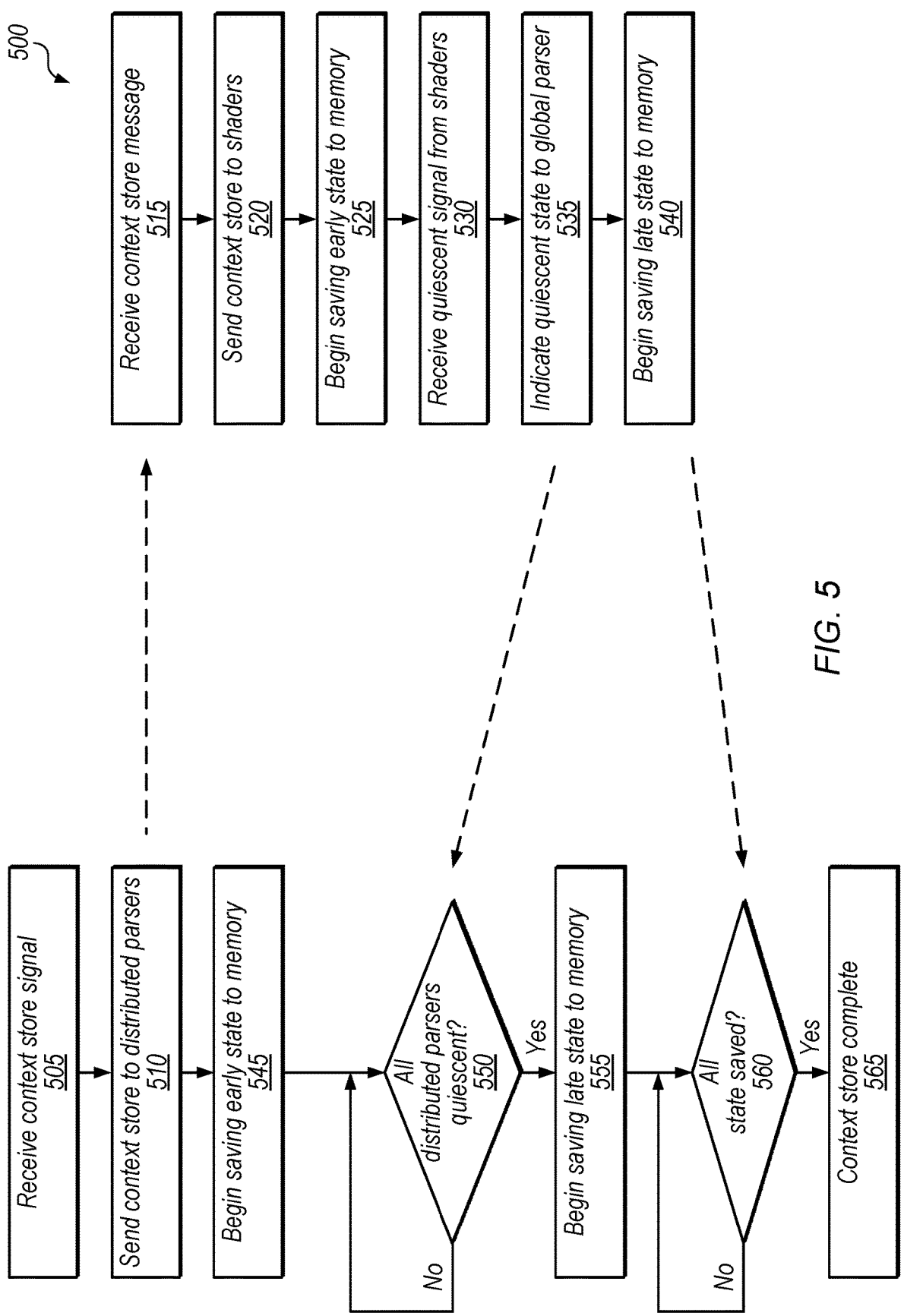
FIG. 5 is a flow diagram illustrating an example method for a context store using distributed parser circuitry, according to some embodiments.
Figure 6:
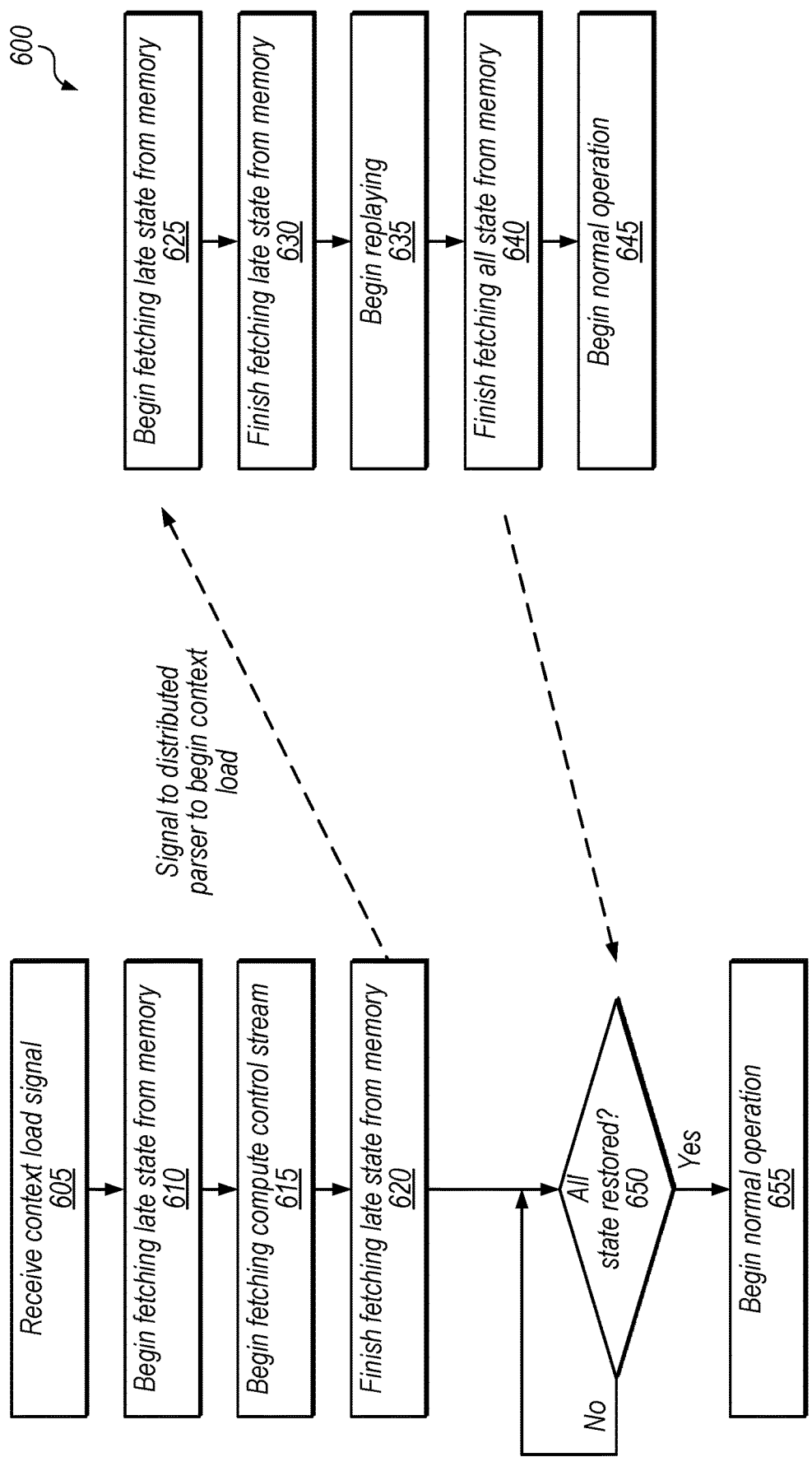
FIG. 6 is a flow diagram illustrating an example method for a context load using distributed parser circuitry, according to some embodiments.

FIG. 2B provides additional details regarding an example distributed parser architecture. FIG. 3 shows an example front-end for fetching compute work, FIG. 4 shows example circuitry for load balancing, and FIGS. 5-6 show techniques for context stores/loads using distributed parsers.

Example Distributed Parser Circuitry

Referring to FIG. 2B, global workload parser 210, in the illustrated embodiment, includes kernel state storage 218 and batch iterator 215. Kernel state information may include static information for a kernel and/or information that may change based on kernel execution. In some embodiments, the global and distributed parsers may communicate kernel state via fabric 230 (e.g., to populate all or a portion of the kernel state 228 maintained by the distributed parsers 220, which may vary among the different parsers).

In the illustrated embodiment, each parser includes a batch iterator 215 or 225. In some embodiments, the batch iterators are configured to maintain the coordinates of the current batch of workgroups. In some embodiments, this coordinate information may be used to retrieve information needed to execute the workgroup.

Each distributed workload parser 220, in the illustrated embodiment, also includes a batch execution queue 240 and workgroup iterator 245. In some embodiments, parsers 220 are configured to store batches in complete form (which may be generated based on the batch iterator coordinates and kernel state 228) in batch execution queue 240 such that they are insulated and independent from other parts of the processing pipeline. Workgroup iterator 245, in the illustrated embodiment, is configured to retrieve batches from batch execution queue 240 and apportion workgroups from retrieved batches among shaders 250A-M for that parser 220. Thus, in some embodiments, batches are generated globally and distributed to different distributed parsers, which in turn distribute workgroups from their received batches.

In some embodiments, to begin processing a kernel, the global workload parser 210 send a kernel start command to all the distributed workload parsers. This command may include data from kernel state 218 that is valid over the entire kernel (e.g., this information may be static during execution, in contrast to dynamic state that may change based on kernel execution). Each distributed parser 220 may save this state information, e.g., in kernel state storage 228. Each distributed parser 220 may also set its batch iterator coordinates to an initial state (e.g., zeros for each coordinate).

After sending the kernel start command, in some embodiments the global workload parser iterates through the kernel. In some embodiments, this iteration generates a next batch of workgroups from the kernel each cycle, and the global workload parser 210 sends information for the current batch via fabric 230 each cycle (e.g., using a batch command). The batch command may indicate the size of the batch and which distributed workload parser is responsible for executing the batch. In some embodiments, the size of the batch is adjustable and may be selected, for example, from among a pre-determined range of value. The size of the batch may be dynamically adjusted from cycle to cycle for load balancing, for example, as discussed in further detail below.

When a distributed workload parser 220 receives a batch command for which it is not responsible, in some embodiments it is configured to update its coordinate state using its batch iterator 225. For example, based on the indicated size of the batch, the batch iterator 225 may determine the next coordinates in multiple dimensions. In some embodiments, sending the size of the batch may reduce traffic over fabric 230, relative to sending actual batch coordinates. In other embodiments, the next coordinates may be explicitly indicated or encoded using other techniques. If a distributed workload parser 220 is responsible for a received batch, in some embodiments it both writes the batch to batch execution queue 240 and updates its coordinate state.

The distributed workload parsers 220, in the illustrated embodiment, are configured to retrieve batches from their respective batch execution queues 240 and iterate through the batches to send workgroups to shader cores. A single workgroup or multiple workgroups from a given batch may be sent to each shader. The workgroup iterator 245 may store coordinates (not shown) for iteration within the current batch.

After sending the last batch, in some embodiments, global workload parser 210 sends a kernel terminate command to all the distributed workload parsers 220. In some embodiments, the distributed workload parsers 220 write this command to their respective queues 240. In some embodiments, the distributed workload parsers 220 are configured to send a kernel terminate indication to shaders 250 based on this command. In some embodiments, the distributed workload parsers 220 send the kernel terminate indication only to shader cores that received workgroups from the current kernel. In these embodiments, the workgroup iterator 245 may maintain control information indicating which shaders received workgroups.

In some embodiments, upon completing received work for a kernel (e.g., upon completion of each workgroup or kernel terminate), a shader 250 is configured to send a completion indicator to its distributed workload parser 220, which in turn informs global workload parser 210 via fabric 230. Note that, because the global workload parser 210 does not have knowledge of shader activity, in embodiments in which the distributed workload parser 220 only sends kernel terminates to shaders that received work for the kernel, it must also send completion indicators for shaders that did not receive work. When the global workload parser 210 receives the expected number of completion indicators, kernel execution is complete, in some embodiments.

Therefore, in some embodiments, kernel starts, kernel terminates, workgroup completions, batch assignments, and kernel terminate completions may be sent via fabric 230 while workgroups, kernel terminates, workgroup completions, and kernel terminate completions may be communicated between distributed parsers 220 and respective sets of shaders 250.

In some embodiments, the disclosed techniques may advantageously reduce the data transmitted over fabric 230, e.g., by including state information in the start command for each kernel and sending only batch size and parser assignment information in batch commands. Further, storing batches in independent form in batch execution queues 240 may avoid a need for additional communications between parsers or other parts of the pipeline when executing batches. Further, tracking which shaders received work may reduce the overall number of kernel terminate indications communicated by the system while still allowing global workload parser 210 to track kernel completion.

Note that, although various example embodiments herein have two hierarchical layers of parsers (e.g., a master workload parser and distributed workload parsers), the disclosed techniques and circuitry may be utilized in parser implementations with various numbers of levels. For example, an intermediate level of distributed parsers may communicate with a master workload parser and lower-level distributed workload parsers using the disclosed techniques. Parsers on a given level may communicate with parsers on multiple other levels using the same communication fabric or different communication fabrics.

Example Front-End Circuitry for Control Stream

FIG. 3 is a block diagram illustrating example circuitry configured to fetch compute control stream data, according to some embodiments. In the illustrated embodiment, front-end circuitry 300 includes stream fetcher 310, control stream data buffer 320, fetch parser 330, indirect fetcher 340, execute parser 350, and execution packet queue 360. In some embodiments, decoupling of fetch parsing and execution parsing may advantageously allow substantial forward progress in fetching in the context of links and redirects, for example, relative to point reached by actual execution.

Note that, in some embodiments, output data from circuitry 300 (e.g., in execution packet queue 360) may be accessed by global workload parser 210 for distribution.

In some embodiments, the compute control stream (which may also be referred to as a compute command stream) includes kernels, links (which may redirect execution and may or may not include a return), and memory commands (e.g., barrier, cache flush, cache flush invalidate, wait on flush). Barriers may indicate that all prior work should complete before proceeding past the barrier. Cache-related commands may be enforced at one or more of various cache levels. Note that the specific formatting and types of compute commands may vary among different implementations, even for different hardware that executes instructions of the same API.

Stream fetcher 310, in the illustrated embodiment, is configured to fetch control stream data and store the data in control stream data buffer 320. In the illustrated embodiment, a write pointer indicates the location for the next control stream data in buffer 320. In some embodiments, stream fetcher 310 is configured to fetch control stream data sequentially until it is re-directed or stopped by downstream processing. This may result in pre-fetching control stream data that is not actually used, but may provide performance benefits, e.g., by avoiding memory fetch latency that may consume a substantial number of cycles. In some embodiments, the compute control stream data is stored sequentially, but also includes link packets that redirect the fetch address and indirect kernel packets that require indirect data accesses. These types of packets are examples of packets that may present challenges when attempting to hide memory fetch latency.

Fetch parser 330, in the illustrated embodiment, is configured to examine at least a portion of the packet indicated by the fetch parse pointer to identify its packet type. In some embodiments, if the packet is a link, fetch parser 330 is configured to redirect stream fetcher 310 and invalidate all younger data and requests in the control stream data buffer and the memory hierarchy (not shown). Fetch parser 330, in the illustrated embodiment, is configured to send indirect kernels to indirect fetcher 340.

Indirect fetcher 340, in some embodiments, is configured to perform indirect fetches (e.g., via a memory hierarchy) and store return data. An "indirect" kernel refers to a kernel for which a memory access outside the compute command stream is needed. For example, a direct kernel may specify the size of the kernel in each dimension within the compute command stream while an indirect kernel may specify an address in the compute command stream. Indirect fetcher 340 may access this address in memory to determine information for the structure (such as the size of the kernel). Once return data is stored, indirect fetcher 340 is configured to notify downstream logic (e.g., execute parser 350) that data is available. In the illustrated embodiment, indirect fetcher 340 includes a request queue for indirect kernels from fetch parser 330. In some embodiments, this allows the fetch parser to work past indirect kernels in the control stream while waiting for indirect fetch returns.

In some embodiments, indirect fetches should not prefetch behind certain memory ordering operations such as barrier or wait-on-flush operations, e.g., because an instruction before these operations may alter the indirect data. Therefore, in some embodiments, fetch parser 330 is configured to maintain a counter that indicates the number of outstanding memory ordering operations. For example, fetch parser 330 may increment the counter for each encountered barrier and wait-on-flush and decrement the counter when one of those operations is executed. In some embodiments, fetch parser 330 may send indirect kernels to indirect fetcher 340 only when the counter value indicates that there are no outstanding older memory ordering operations of one or more monitored types. In some embodiments, the value of the counter may be re-loaded on a context load, e.g., by analyzing restored data in the control stream data buffer 320.

Execute parser 350, in the illustrated embodiment, is configured to process packets identified by the execution parse pointer. As shown, execute parser may receive control stream data from two sources: the control stream data buffer and the indirect fetcher. During operation, the execution parse pointer may lag behind the fetch parse pointer, which may advantageously increase ability to hide memory latency (e.g., by allowing the fetch parser 330 to identify links and indirect kernels quickly and begin handling these situations before execution parser 350 is ready for the packets). In the illustrated embodiment, for indirect kernels, indirect fetcher 340 is configured to indicate when the data is available to execute parser 350. In some embodiments, once all of a given packet's data is present, execute parser 350 sends packets in full form to execution packet queue 360 and increments the execution parse pointer. In the execution packet queue 360, compute kernels may be stored in a decoded format that is recognized by downstream circuitry (e.g., global parser 210).

Example Load Balancing Techniques

FIG. 4 is a block diagram illustrating example circuitry for load balancing among distributed workload parsers and shaders, according to some embodiments. Similarly numbered elements in FIGS. 2 and 4 may be configured similarly and are not described in detail here. In the illustrated embodiment, global workload parser 210 include downstream resource tracker 402, sequential work indicator 404, batch size indicator 406, and queue credit tracker 408. In the illustrated embodiment, each distributed workload parser 220 includes a queue credit tracker 412 and a resource tracker 418.

In some embodiments, batches and kernel terminate commands are sent using a credited queue mechanism. Note that kernel start and non-executed batches may not require queue space, which may save area by reducing required queue size. In some embodiments, global workload parser 210 is configured to implement the credited queue mechanism such that batches are not allowed to take the last queue space of a distributed workload parser 220. In some embodiments, this may avoid stalling on a kernel terminate command, which needs a queue space in all distributed workload parsers. In some embodiments, global workload parser 210 uses queue credit tracker 408 to track the available queue space in each distributed parser 220. For example, a counter for each parser 220 may be decremented when sending an item to that parser's queue and incremented each time that parser reports completion of an item.

Downstream resource tracker 402, in the illustrated embodiment, is configured to maintain information indicating the resources available in each distributed parser 220. In some embodiments, global workload parser 210 is configured to select a distributed parser 220 for the next batch distributed based on the tracked resources. For example, global workload parser 210 may selected the distributed parser 220 that has the least amount of outstanding work (e.g., workitems that have been assigned but not completed).

Sequential work indicator 404, in some embodiments, specifies that multiple workgroups or batches should be sent sequentially to the same distributed parser 220. For example, sequential work indicator 404 may be set to facilitate efficient cache access, which may be adversely affected if workgroups are distributed at fine granularity. Sequential work indicators may be fixed or may be adjustable (e.g., by software). A sequential work indicator may by dynamically changed during execution of a kernel. In some embodiments, the sequential work indicator is set by software based on profiling of cache access patterns for prior workloads.

In some embodiments, when selecting a distributed parser 220 to receive a batch, global parser 210 is configured to select a parser 220 that has sufficient queue space to fit the sequence of batches of the size indicated by sequential work indicator 440. In some embodiments, global parser 210 ensures that at least one queue space remains open after sending the sequence of batches.

In some embodiments, global parser 210 may adjust the number of workgroups in a batch (e.g., using batch size indicator 406) to fit a sequence of batches into a particular distributed parser's queue. For example, consider a sequence of three batches, each containing ten workgroups and a distributed workload parser 220 with three open queue entries. In order to leave a queue entry open (e.g., to avoid stalls on a kernel terminate), global workload parser 210 may adjust the batch size to fifteen workgroups per batch and transmit the resulting two batches to the distributed workload parser 220.

In some embodiments, the global workload parser 210 is configured to maintain information (e.g., a bit per distributed parser) indicating whether that distributed parser 220 received any batches from the current kernel. In some embodiments, global workload parser 210 is configured to send kernel terminate commands only to distributed parsers 220 that received a batch from the current kernel.

In some embodiments, the distributed workload parsers 220 are configured to implement a similar credited queue mechanism when sending workgroups to shaders 250. In the illustrated embodiment, each parser 220 includes a queue credit tracker 412 configured to track the number of available entries in queues 414. In some embodiments, workgroups and kernel terminates take a queue space in a queue 414. In some embodiments, the distributed parsers 220 are configured not to send workgroups that would use the last space in a queue, to prevent stalling on kernel terminates.

In some embodiments, the distributed workload parsers 220 are configured to track the resources for each shader 250 using resource tracker 418 (e.g., the number of outstanding workitems sent to each shader) and select a shader for each workgroup based on the tracked resources. In some embodiments, distributed workload parser 220 also maintains a control register (which is not explicitly shown, but may be similar to sequential work indicator 404) that indicates a number of sequential workgroups that should be sent to the same shader, e.g., to promote efficient cache access. In some embodiments, the distributed workload parsers 220 are configured to maintain information (e.g., a bit per shader) that indicates whether any workgroups from the current kernel were sent to that shader 250. In some embodiments, the parsers 220 are configured to send kernel terminate commands only to shaders 250 that received a batch from the current kernel.

In some embodiments, the disclosed techniques may advantageously improve cache efficiency (e.g., by sending workgroups that are spatially nearby in the kernel to the same shader, because these workgroups may access nearby memory locations). In some embodiments, the disclosed techniques may avoid stalling, e.g., by using the credited queue mechanisms, tracking which parsers 220 and shaders 250 received work from the current kernel, and adjusting batch size to avoid using the last available space in a queue.

Example Context Switch Techniques Using Distributed Parser Circuitry

FIG. 5 is a flow diagram illustrating a method for a context store and FIG. 6 is a flow diagram illustrating a context load, according to some embodiments. In some embodiments, an operating system may execute large compute kernals as a lower priority background task. In this scenario, a high priority task may be received, e.g., to update a device display after receiving user input. It may be important to context store the compute task, perform the high priority task as quickly as possible, and then context load the compute task and finish executing it. Thus, in various embodiments, it may be advantageous to reduce the latency of the context store. In some embodiments, the distributed techniques discussed above (e.g., with a hierarchical arrangement of parsers communicating over a fabric) may present challenges in reducing context switch latency. The techniques shown in FIGS. 5-6 may reduce context switch latency.

In FIG. 5, elements 515-540 may be performed by distributed parsers 220 while elements 505-510 and 545-565 may be performed by global workload parser 210.

At 505, in the illustrated embodiment, global parser 210 receives a context store signal. For example, software such as the operating system may send this signal using a configuration register. In some embodiments, global parser 210 immediately stops distributing work from the current kernel in response to the context store signal.

At 510, in the illustrated embodiment, global parser 210 sends a context store message to each distributed parser 220. In some embodiments, global parser 210 sends the context store messages and begins saving early state (as discussed in further detail below) immediately in response to the context store signal.

At 545, in the illustrated embodiment, global parser 210 begins saving its early state to memory. The "early" state refers to state information that will not change at this point (e.g., will not be affected by downstream processing) while "late" state refers to state information that may change based on completions from the shaders. For example, the early state may include internal queues while the late state may include information that tracks outstanding workitems/workgroups, whether the kernel is complete, and/or a call stack for links with return and return from link commands. In some embodiments, early and late state corresponds to static and dynamic state information respectively. In other embodiments, some dynamic state information may be classified as early state if it is determined that it will not change, e.g., based on knowledge of outstanding workitems.

At 515, in the illustrated embodiment, the distributed parsers receive the context store message. At 520, the distributed parsers send a context store message to the shaders. At 525, the distributed parsers begin saving their early state to memory. In some embodiments, in response to the context store message, the distributed parsers immediately stop distributing compute work and send the context store message to the shaders.

Upon receiving the context store message, the shaders may continue executing until reaching a quiescent state and then send a quiescent signal to their corresponding distributed parser 220. At 530, in the illustrated embodiment, the distributed parsers 220 receive the quiescent signal. At 535, in the illustrated embodiment, in response to this signal the distributed parsers 220 indicate the quiescent state to global parser 210 and begin saving their late state to memory at 540 (and the distributed parsers 220 may indicate to global parser 210 when they have finished writing their late state to memory).

At 550, in the illustrated embodiment, global parser 210 waits until all distributed parsers have indicated that all their active shaders have reached a quiescent state. Once this has occurred, global parser 210 can begin saving its late state to memory at 555.

At 560, in the illustrated embodiment, global parser 210 waits until all late state has been saved to memory (e.g., from both global parser 210 and all the corresponding distributed parsers 220 as shown by the final dashed arrow in FIG. 5). When this has occurred, the context store is complete at 565. At this point, circuitry 200 may begin parsing compute data for another task and/or shaders 250 may be used for other work (e.g., a different compute kernel, or fragment or vertex shading).

In some embodiments, the techniques of FIG. 5 may advantageously notify the shaders 250 distributed shaders quickly so that they can freeze execution (e.g., complete any workitems/workgroups that have already started and refrain from starting additional workitems/workgroups). Note that the global workload parser 210 may send the context store message immediately in response to the context store signal, even though it cannot begin storing all its state right away. Further, segmenting context data into early and late sets may hide the latency of storing the early data while workgroups are still executing.

Referring to FIG. 6, at 605 in the illustrated embodiment, global parser 210 receives a context load signal. In the illustrated embodiment, it begins fetching its late state from memory at 610 and begins fetching from the compute control stream at 615.

At 620, in the illustrated embodiment, global parser 210 finishes fetching late state from memory. In response, global parser 210 signals to the distributed parsers 220 to being their context load.

At 625, in the illustrated embodiments, the distributed parsers begin fetching their late state from memory. Once they have finished fetching their late state from memory at 630, they begin replaying workgroups to restore the pipeline from the bottom up at 635. Once all state is fetched from memory at 640, the distributed parsers indication the completion to global parser 210. At 645, the distributed parsers 220 begin normal operation.

At 650, in the illustrated embodiment, the global parser 210 waits until all state has been restored (including its late and early state and the late and early state for each distributed parser 220) and begins normal operation at 655. At this point, the context load is complete. Note that the global parser 210 may begin fetching the compute control stream at 615, but may stall the pipeline at a certain point until the distributed parsers are done with the context load. Thus, the compute control stream data may be fetched while the distributed parsers are restoring the pipeline from the bottom up. This may advantageously reduce or eliminate fetch latency from the overall context load time.

Example Methods

Figure 7:
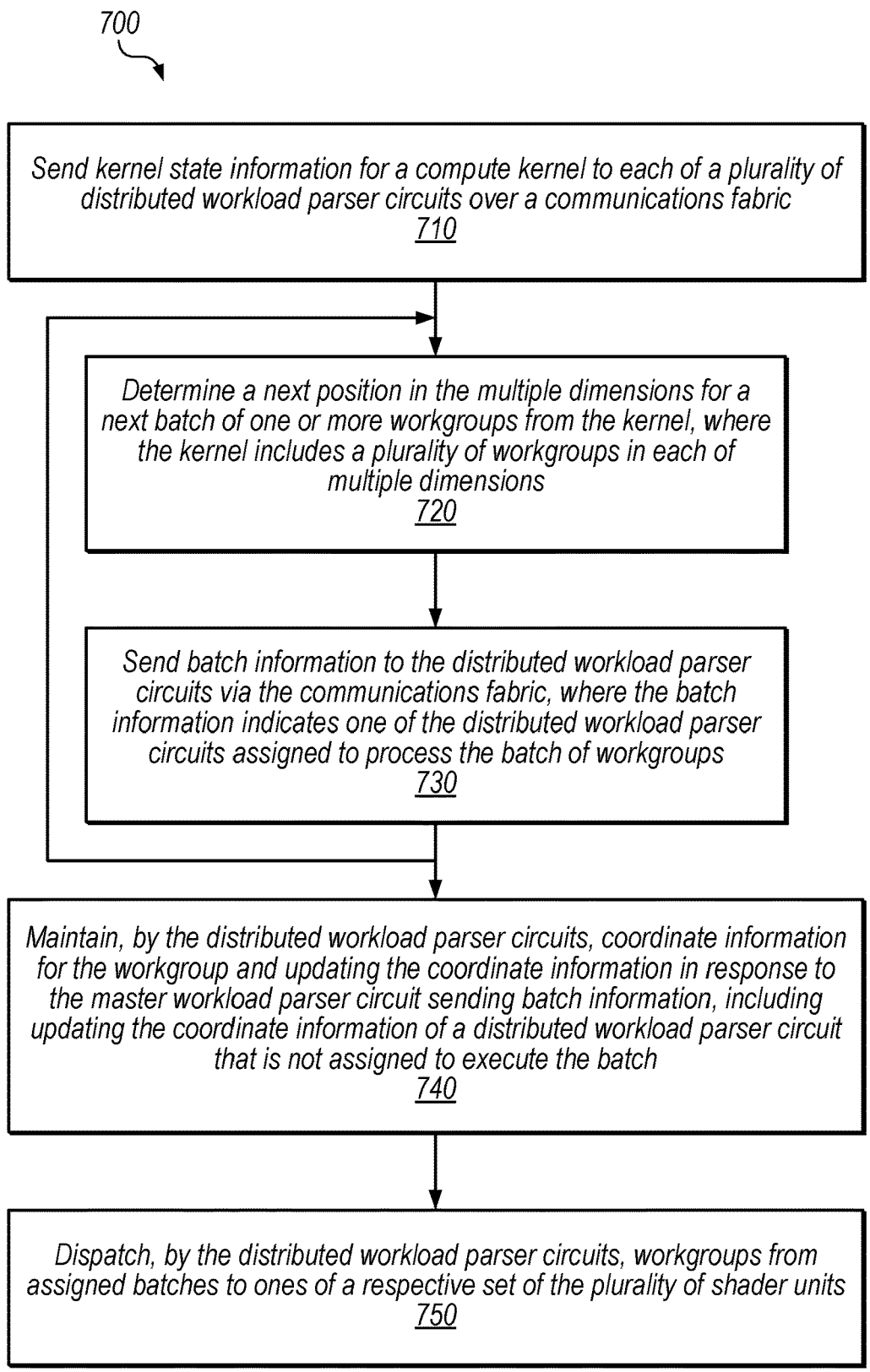
FIG. 7 is a flow diagram illustrating an example method for distributing compute work using a distributed architecture, according to some embodiments.

FIG. 7 is a flow diagram illustrating a method 700 for distributing compute work using a distributed architecture, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a master workload parser circuit (e.g., global parser 210) sends kernel state information for a compute kernel to each of a plurality of distributed workload parser circuits over a communications fabric. In some embodiments, the kernel state information is included in a kernel start command.

At 720, in the illustrated embodiment, the master workload parser circuit determines a next position in the multiple dimensions for a next batch of one or more workgroups from the kernel, where the kernel includes a plurality of workgroups in each of multiple dimensions.

At 730, in the illustrated embodiment, the master workload parser circuit sends batch information to the distributed workload parser circuits via the communications fabric, where the batch information indicates one of the distributed workload parser circuits assigned to process the batch of workgroups. Note that elements 720 and 730 may be performed iteratively, e.g., until the end of the current kernel or until another event (such as a context switch) occurs.

At 740, in the illustrated embodiment, the distributed workload parser circuits maintain coordinate information for the workgroup and update the coordinate information in response to the master workload parser circuit sending batch information, including updating the coordinate information of a distributed workload parser circuit that is not assigned to execute the batch At 750, in the illustrated embodiment, the distributed workload parser circuits dispatch workgroups from assigned batches to ones of a respective set of the plurality of shader units.

In some embodiments, the batch information indicates a size of the batch and the distributed workload parsers circuits are configured to update the coordinate information based on the indicated size of the batch. In some embodiments, the master workload parser circuit is configured to send a kernel start command to the distributed workload parser circuits before iterating through the kernel. In some embodiments, the kernel start command includes state information that is valid for the entire kernel and the distributed workload parser circuits are configured to reset their coordinate information in response to the kernel start command.

In some embodiments, the master workload parser circuit is configured to send a kernel terminate indication in response to assigning all workgroups from a current kernel. In some embodiments, the master workload parser circuit is configured to send the kernel terminate indication only to distributed workload parser circuits that received at least one batch from the current kernel. In some embodiments, the shader units are configured to report processing of received kernel terminate indications to their corresponding distributed workload parser circuit and the distributed workload parser circuits are configured to report processing of kernel terminate indications to the master workload parser circuit via the communications fabric. In some embodiments, the distributed workload parser circuits are configured to track which shader units received work from a current kernel, forward kernel terminate indications only for shader units that received work from a current kernel, and initiate reports of processing of the kernel terminate indications for shader units that did not receive a kernel terminate indication for the current kernel. In some embodiments, the shader units are configured to report workgroup completion to their corresponding distributed workload parser circuit and the distributed workload parser circuits are configured to report workgroup completion to the master workload parser circuit via the communications fabric. In some embodiments, the master workload parser circuit is configured to detect kernel completion based on receiving workgroup completion reports for all assigned workgroups for a current kernel.

In some embodiments, the distributed workload parser circuits each include queue circuitry configured to store assigned batches and corresponding state information from a kernel start command.

Figure 8:
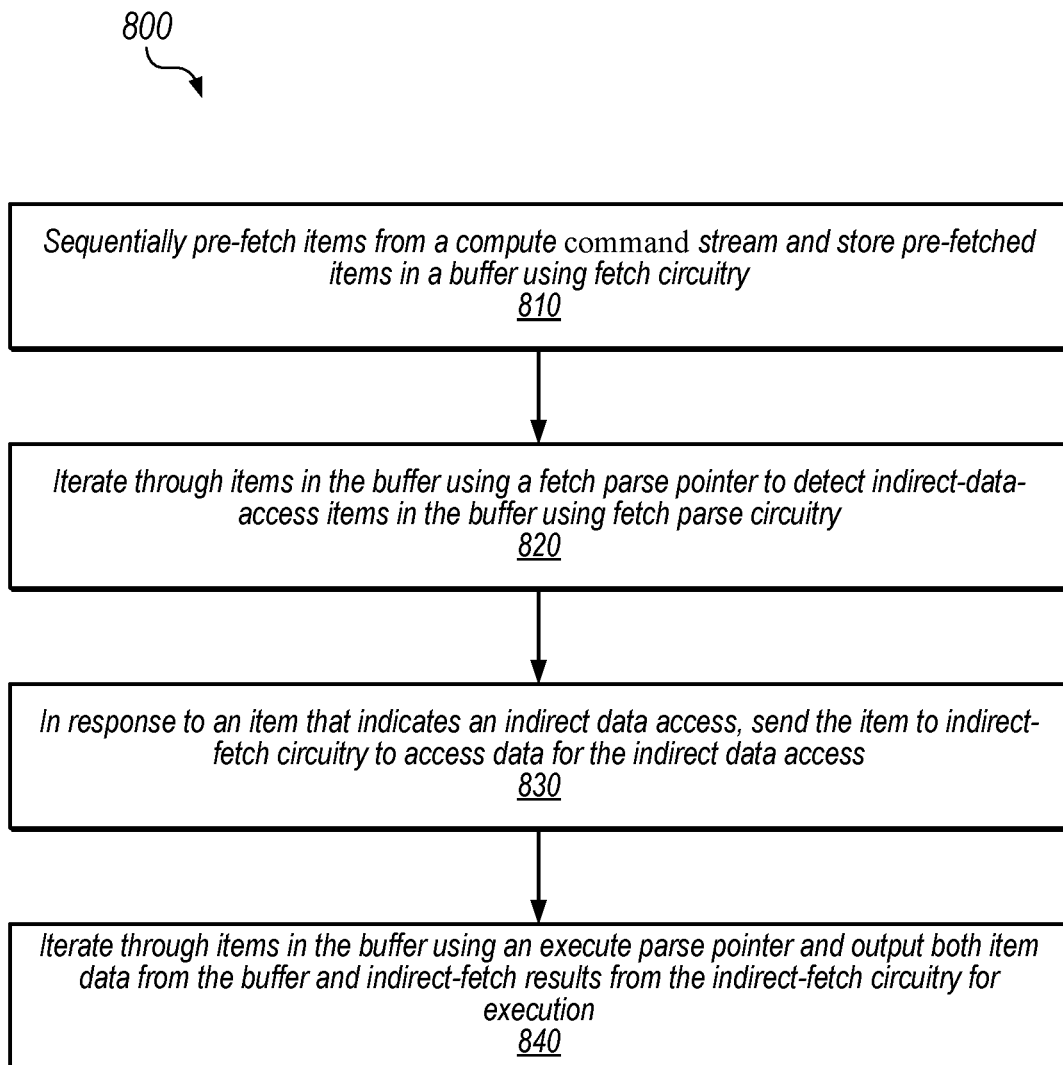
FIG. 8 is a flow diagram illustrating an example method for fetching kernels from a compute command stream, according to some embodiments.

FIG. 8 is a flow diagram illustrating a method 800 for fetching kernels from a compute command stream (e.g., the compute control stream of FIG. 3), according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, fetch circuitry (e.g., stream fetcher 310) sequentially pre-fetches items from a compute command stream and store pre-fetched items in a buffer.

At 820, in the illustrated embodiment, fetch parse circuitry (e.g., fetch parser 330) iterates through items in the buffer using a fetch parse pointer to detect indirect-data-access items in the buffer.

At 830, in the illustrated embodiment, the fetch parser circuitry sends an item to indirect-fetch circuitry to access data for the indirect data access, in response to the item indicating an indirect data access.

At 850, in the illustrated embodiment, execute parse circuitry (e.g., execute parser 350) iterates through items in the buffer using an execute parse pointer and output both item data from the buffer and indirect-fetch results from the indirect-fetch circuitry for execution.

In some embodiments, the fetch parse circuitry is further configured to: detect redirect items in the buffer when iterating through the items and, in response to an item that indicates a redirect, redirect the fetch circuitry to a non-sequential address in the compute command stream.

In some embodiments, the indirect-fetch circuitry includes a request queue configured to store a plurality of indirect items received from the fetch parse circuitry. In some embodiments, the indirect-fetch circuitry is configured to send an indication to the execute parse circuitry when indirect-fetch results are available. In some embodiments, the fetch parse circuitry is configured to send indirect-fetch items to the indirect-fetch circuitry only when there are no older outstanding memory ordering operations of one or more particular types. In some embodiments, the fetch parse circuitry is configured to restore information indicating a number of outstanding memory ordering operations in conjunction with a context load. For example, in response to a context store, everything in the fetch pipeline may be discarded because it is before the context switch commitment point. Upon a context load, fetching may begin at a fetch address. To restore the counter data, in some embodiments, loaded instructions are monitored after the context switch commitment point and targeted memory ordering instructions that are detected are used to increment the counter. In some embodiments, the execute parse circuitry is configured to output item data to an execution packet queue in a format recognized by workload parser circuitry.

Figure 9:
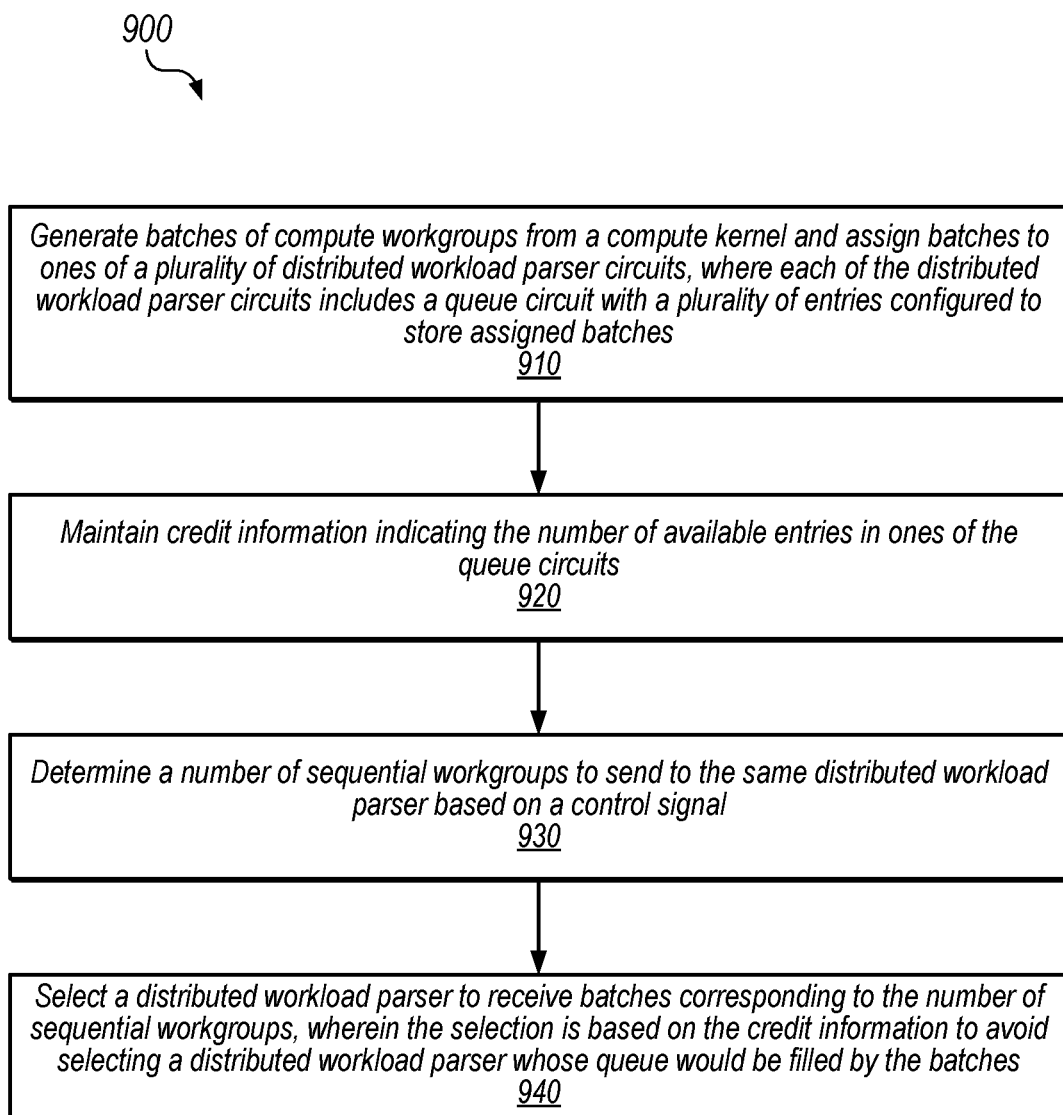
FIG. 9 is a flow diagram illustrating an example method for load balancing using distributed parsing circuitry, according to some embodiments.

FIG. 9 is a flow diagram illustrating a method 900 for load balancing using distributed parsing circuitry, according to some embodiments. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, a master workload parser circuit (e.g., global parser 210) generates batches of compute workgroups from a compute kernel and assigns batches to ones of the distributed workload parser circuits. In the illustrated embodiment, each of the distributed workload parser circuits includes a queue circuit with a plurality of entries configured to store assigned batches.

At 920, in the illustrated embodiment, the master workload parser circuit maintains credit information indicating the number of available entries in ones of the queue circuits.

At 930, in the illustrated embodiment, the master workload parser circuit determines a number of sequential workgroups to send to the same distributed workload parser based on a control signal.

At 940, in the illustrated embodiment, the master workload parser circuit selects a distributed workload parser to receive batches corresponding to the number of sequential workgroups. In the illustrated embodiment, the selection is based on the credit information to avoid selecting a distributed workload parser whose queue would be filled by the batches.

In some embodiments, the queue circuits are also configured to store kernel terminate signals and the master workload parser circuit is configured to transmit kernel terminate signals to the plurality of distributed workload parser circuits at an end of the kernel. In some embodiments, the avoidance of selecting a distributed workload parser whose queue would be filled by the batches prevents stalling on a kernel terminate command due to a full queue. In some embodiments, the control signal is specified by a control register that is set by software based on profiling of past workloads. In some embodiments, the master workload parser circuit is configured to combine workgroups from multiple batches into a smaller number of batches in order to assign the batches to a distributed workload parser without filling the distributed workload parser's queue.

In some embodiments, the master workload parser circuit is configured to track the amount of outstanding work for the kernel sent to each distributed workload parser circuit and select the distributed workload parser to receive the batches based on the tracking. In some embodiments, the master workload parser circuit is configured to maintain an indication of whether each distributed workload parser circuit received work from the compute kernel and send kernel terminate signals only to distributed workload parser circuits that received work from the compute kernel.

In some embodiments, the distributed workload parser circuits are configured to: distribute workgroups among respective sets of shader units, maintain shader credit information indicating the number of available entries in shader queues for the shader units, determine a number of sequential workgroups to send to a shader unit based on a control signal, and select a shader unit to receive workgroups corresponding to the number of sequential workgroups based on the shader credit information, to avoid selecting a shader unit whose shader queue would be filled by the workgroups. In some embodiments, the distributed workload parser circuits are configured to maintain an indication of whether each associated shader unit received work from the compute kernel and send kernel terminate signals only to shader units that received work from the compute kernel. In some embodiments, the distributed workload parser circuits are configured to track the amount of outstanding work (e.g., number of assigned but not yet completed workitems) sent to each shader unit. In some embodiments, the distributed workload parser circuits select a shader to receive a workgroup based on this tracking (e.g., to select the shader unit with the lowest number of outstanding workitems).

Figure 10:
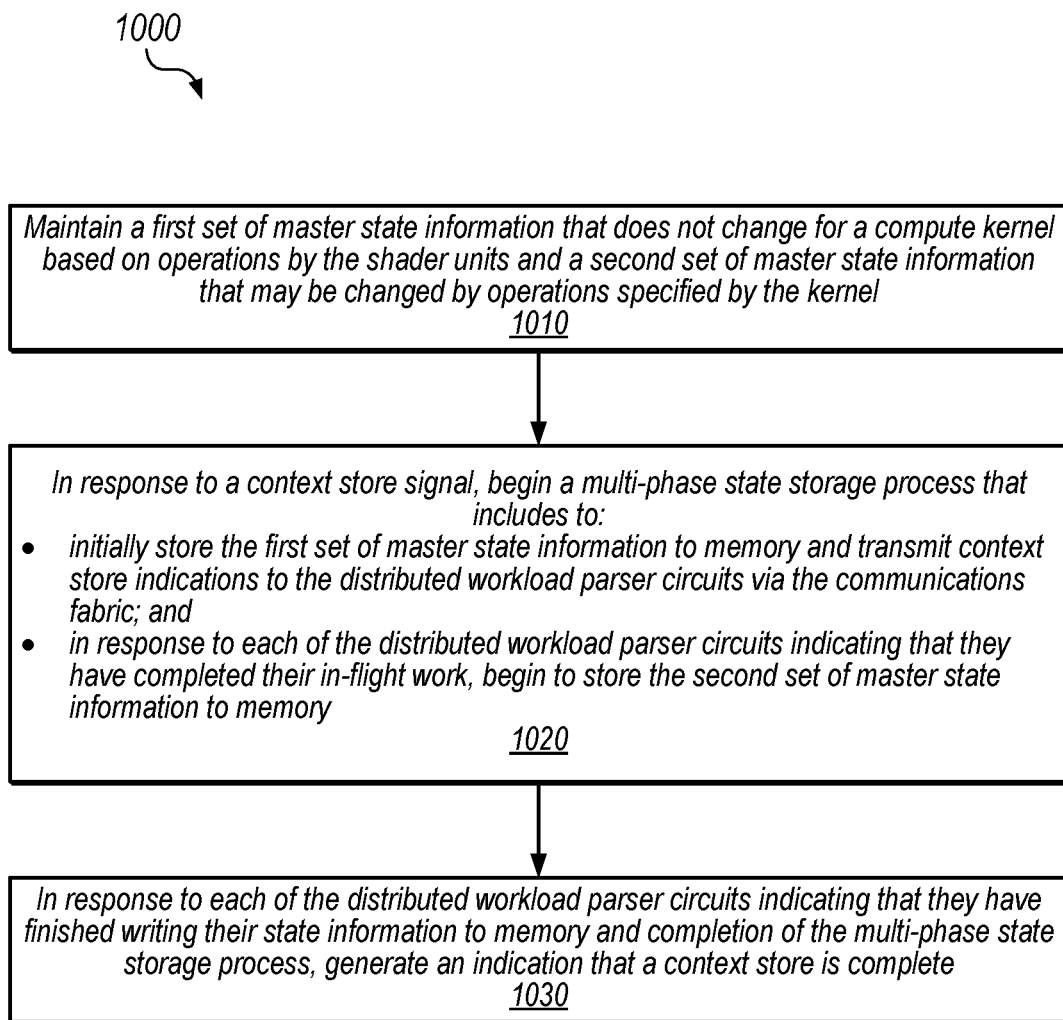
FIG. 10 is a flow diagram illustrating an example method for performing a context store using distributed parsing circuitry, according to some embodiments.

FIG. 10 is a flow diagram illustrating a method 1000 for performing a context store using distributed parsing circuitry, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, a master workload parser circuit (e.g., global parser 210) maintains a first set of master state information that does not change for a compute kernel based on operations by the shader units and a second set of master state information that may be changed by operations specified by the kernel.

At 1020, in the illustrated embodiment, the master workload parser circuit begins a multi-phase state storage process in response to a context store signal. In the illustrated embodiment, this process includes: initially storing the first set of master state information to memory and transmit context store indications to the distributed workload parser circuits via the communications fabric and, in response to each of the distributed workload parser circuits indicating that they have completed their in-flight work, beginning to store the second set of master state information to memory.

At 1030, in the illustrated embodiment, the master workload parser circuit generate an indication that a context store is complete in response to each of the distributed workload parser circuits indicating that they have finished writing their state information to memory and completion of the multi-phase state storage process.

In some embodiments, the distributed workload parser circuits are configured to: maintain a first set of distributed state information that does not change for a compute kernel based on operations by the shader units and a second set of distributed state information that may be changed by operations specified by the kernel. In some embodiments, in response to the context store indication from the master workload parser circuit, the distributed parser circuits are configured to: send a context store indication to one or more associated shaders and begin storing the first set of distributed state information. In some embodiments, in response to a signal indicating shader quiescence for associated shaders, the distributed parser circuits are configured to: send an indication of completion of in-flight work to the master workload parser circuit and begin storing the second set of distributed state information.

In some embodiments, the master workload parser circuit is configured to transmit the context store indications prior to beginning to store the first and second sets of master state information.

In some embodiments, the master workload parser circuit is further configured to, in response to a context load signal, begin a multi-phase state load process that includes to: begin fetching the second set of state information and begin fetching work for the compute kernel. In some embodiments, the master workload parser circuit is configured to, in response to completion of loading the second set of state information, send a context load indication to the distributed workload parser circuits and begin distributed work from the compute kernel in response to receipt of indications from the distributed workload parser circuits that their respective state has been loaded.

In some embodiments, the distributed workload parser circuits are further configured to: maintain a first set of distributed state information that does not change for a compute kernel based on operations by the shader units and a second set of distributed state information that may be changed by operations specified by the kernel, in response to the context load indication, begin fetching the second set of distributed state information, and in response to completion of fetching the second set of distributed state information, begin replaying instructions from the compute kernel. In some embodiments, the distributed workload parser circuits are further configured to: in response to completion of fetching both the first and second sets of distributed state information, send a completion indication to the master workload parser circuit. In some embodiments, the master workload parser circuit is configured to stall while waiting for the completion indication.

Example Device

Figure 11:
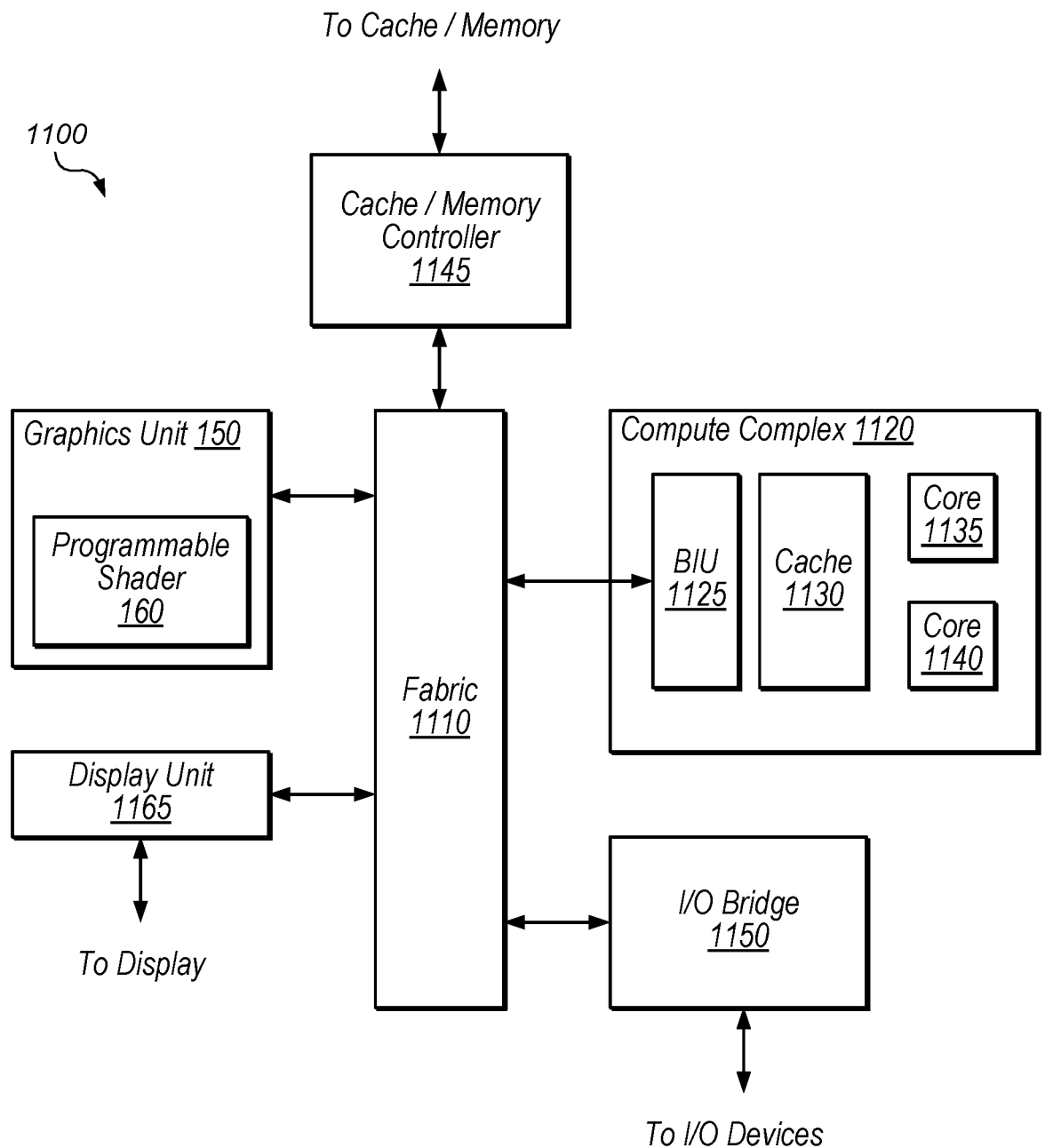
FIG. 11 is a block diagram illustrating one embodiment of a device that includes a graphics unit.

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 150, and display unit 1165. In some embodiments, device 1100 may include other components (not shown) in addition to and/or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and/or caches. For example, compute complex 1120 may include 1, 2, or 4 processor cores, or any other suitable number. In one embodiment, cache 1130 is a set associative L2 cache. In some embodiments, cores 1135 and/or 1140 may include internal instruction and/or data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions.

Cache/memory controller 1145 may be configured to manage transfer of data between fabric 1110 and one or more caches and/or memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches.

As used herein, the term "coupled to" may indicate one or more connections between elements, and a coupling may include intervening elements. For example, in FIG. 11, graphics unit 150 may be described as "coupled to" a memory through fabric 1110 and cache/memory controller 1145. In contrast, in the illustrated embodiment of FIG. 11, graphics unit 150 is "directly coupled" to fabric 1110 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and/or low-power always-on functionality, for example. I/O bridge 1150 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1100 via I/O bridge 1150.

Example Computer-Readable Medium

The present disclosure has described various example circuits in detail above. It is intended that the present disclosure cover not only embodiments that include such circuitry, but also a computer-readable storage medium that includes design information that specifies such circuitry.

Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 12:
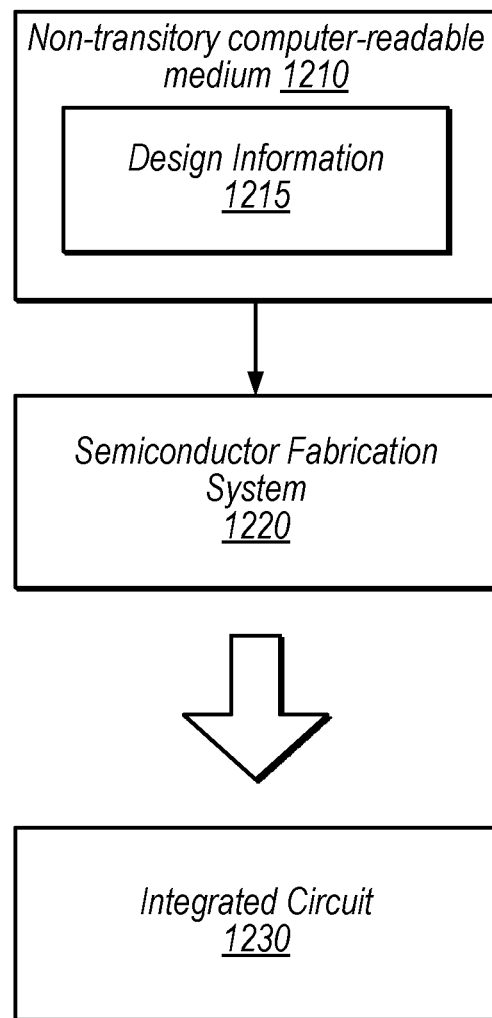
FIG. 12 is a block diagram illustrating an example computer-readable medium that stores circuit design information, according to some embodiments.

FIG. 12 is a block diagram illustrating an example non-transitory computer-readable storage medium that stores circuit design information, according to some embodiments. In the illustrated embodiment semiconductor fabrication system 1220 is configured to process the design information 1215 stored on non-transitory computer-readable medium 1210 and fabricate integrated circuit 1230 based on the design information 1215.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system 1220. In some embodiments, design information 1215 may also include one or more cell libraries which specify the synthesis and/or layout of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit. For example, design information 1215 may specify the circuit elements to be fabricated but not their physical layout. In this case, design information 1215 may need to be combined with layout information to actually fabricate the specified circuitry.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown in FIG. 1B or 2A-2B, 3, and/or 4. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of shader processors configured to perform operations for compute workgroups included in compute kernels processed by the apparatus, wherein one or more of the kernels include a plurality of workgroups in each of multiple dimensions; and
   a plurality of distributed workload parser circuits;
   a communications fabric connected to the plurality of distributed workload parser circuits and a master workload parser circuit; and
   the master workload parser circuit configured to:
      send kernel state information for a compute kernel to each of the distributed workload parser circuits over the communications fabric;
      for multiple iterations:
         determine a next position in the multiple dimensions for a next batch of one or more workgroups from the kernel; and
         send batch information to the distributed workload parser circuits via the communications fabric, wherein the batch information indicates one of the distributed workload parser circuits assigned to process the batch of workgroups;
wherein the distributed workload parser circuits are configured to:
maintain coordinate information for the kernel and update the coordinate information in response to the master workload parser circuit sending batch information, including when the distributed workload parser circuit is not assigned to execute the batch; and
dispatch workgroups from assigned batches to ones of a respective set of the plurality of shader processors.

2. The apparatus of claim 1, wherein the batch information indicates a size of the batch and the distributed workload parsers circuits are configured to update the coordinate information based on the indicated size of the batch.

3. The apparatus of claim 1, wherein the master workload parser circuit is configured to send a kernel start command to the distributed workload parser circuits before iterating through the kernel;
wherein the kernel start command includes state information that is valid for the entire kernel; and
wherein the distributed workload parser circuits are configured to reset coordinate information in response to the kernel start command.

4. The apparatus of claim 1, wherein the master workload parser circuit is configured to send a kernel terminate indication in response to assigning all workgroups from a current kernel, wherein the master workload parser circuit is configured to send the kernel terminate indication only to distributed workload parser circuits that received at least one batch from the current kernel.

5. The apparatus of claim 4, wherein a respective shader processors is configured to report processing of the received kernel terminate indication to a corresponding distributed workload parser circuit and the distributed workload parser circuits are configured to report processing of kernel terminate indications to the master workload parser circuit via the communications fabric.

6. The apparatus of claim 5, wherein the distributed workload parser circuits are configured to track which shader processors received work from a current kernel, forward kernel terminate indications only for shader processors that received work from the current kernel, and initiate reports of processing of the kernel terminate indications for shader processors that did not receive the kernel terminate indication for the current kernel.

7. The apparatus of claim 1, wherein a respective shader processors is configured to report workgroup completion to a corresponding distributed workload parser circuit and the distributed workload parser circuits are configured to report workgroup completion to the master workload parser circuit via the communications fabric.

8. The apparatus of claim 7, wherein the master workload parser circuit is configured to detect kernel completion based on receiving workgroup completion reports for all assigned workgroups for a current kernel and indications of kernel terminate completion for each shader processors.

9. The apparatus of claim 1, wherein the batch information consists of information specifying a size of the batch and information specifying the assigned one of the distributed workload parser circuits.

10. The apparatus of claim 1, wherein the distributed workload parser circuits each include queue circuitry configured to store assigned batches and corresponding state information from a kernel start command.

11. A method, comprising:
sending, by a master workload parser circuit, kernel state information for a compute kernel to each of a plurality of distributed workload parser circuits over a communications fabric;
for multiple iterations, the master workload parser circuit:
determining a next position in multiple dimensions for a next batch of one or more workgroups from the kernel, wherein the kernel includes a plurality of workgroups in each of multiple dimensions; and
sending batch information to the distributed workload parser circuits via the communications fabric, wherein the batch information indicates one of the distributed workload parser circuits assigned to process the batch of workgroups;
maintaining, by the distributed workload parser circuits, coordinate information for the kernel and updating the coordinate information in response to the master workload parser circuit sending batch information, including updating the coordinate information of a distributed workload parser circuit that is not assigned to execute the batch; and
dispatching, by the distributed workload parser circuits, workgroups from assigned batches to ones of a respective set of a plurality of shader processors.

12. The method of claim 11, further comprising:
sending, by the master workload parser circuit, a kernel start command to the distributed workload parser circuits before iterating through the kernel, wherein the kernel start command includes state information that is valid for the entire kernel; and
resetting, by the distributed workload parser circuits, the coordinate information in response to the kernel start command.

13. The method of claim 11, further comprising:
sending a kernel terminate indication in response to assigning all workgroups from a current kernel, wherein the kernel terminate indication is sent only to distributed workload parser circuits that received at least one batch from the current kernel.

14. The method of claim 11, further comprising:
reporting, by the shader processors, workgroup completion to corresponding distributed workload parser circuits; and
reporting, by the distributed workload parser circuits, the workgroup completion to the master workload parser circuit via the communications fabric.

15. A non-transitory computer readable storage medium having stored thereon design information that specifies a design of at least a portion of a hardware integrated circuit in a format recognized by a semiconductor fabrication system that is configured to use the design information to produce the circuit according to the design, including:
a plurality of shader processors configured to perform operations for compute workgroups included in compute kernels processed by the circuit, wherein one or more of the kernels include a plurality of workgroups in each of multiple dimensions; and
a plurality of distributed workload parser circuits;
a communications fabric connected to the plurality of distributed workload parser circuits and a master workload parser circuit; and
the master workload parser circuit configured to:
send kernel state information for a compute kernel to each of the distributed workload parser circuits over the communications fabric;
for multiple iterations:

determine a next position in the multiple dimensions for a next batch of one or more workgroups from the kernel; and send batch information to the distributed workload parser circuits via the communications fabric, wherein the batch information indicates one of the distributed workload parser circuits assigned to process the batch of workgroups;

wherein the distributed workload parser circuits are configured to:

maintain coordinate information for the kernel and update the coordinate information in response to the master workload parser circuit sending batch information, including when the distributed workload parser circuit is not assigned to execute the batch; and dispatch workgroups from assigned batches to ones of a respective set of the plurality of shader processors.

16. The non-transitory computer readable storage medium of claim 15, wherein the master workload parser circuit is configured to send a kernel start command to the distributed workload parser circuits before iterating through the kernel;

wherein the kernel start command includes state information that is valid for the entire kernel; and wherein the distributed workload parser circuits are configured to reset coordinate information in response to the kernel start command.

17. The non-transitory computer readable storage medium of claim 15, wherein the master workload parser circuit is configured to send a kernel terminate indication in response to assigning all workgroups from a current kernel, wherein the master workload parser circuit is configured to send the kernel terminate indication only to distributed workload parser circuits that received at least one batch from the current kernel.

18. The non-transitory computer readable storage medium of claim 17, wherein the shader processors are configured to report processing of received kernel terminate indications to corresponding distributed workload parser circuits and the distributed workload parser circuits are configured to report processing of kernel terminate indications to the master workload parser circuit via the communications fabric; and wherein the distributed workload parser circuits are configured to track which shader processors received work from a current kernel, forward kernel terminate indications only for shader processors that received work from a current kernel, and initiate reports of processing of the kernel terminate indications for shader processors that did not receive a kernel terminate indication for the current kernel.

19. The non-transitory computer readable storage medium of claim 15, wherein the shader processors are configured to report workgroup completion to corresponding distributed workload parser circuits and the distributed workload parser circuits are configured to report workgroup completion to the master workload parser circuit via the communications fabric.

20. The non-transitory computer readable storage medium of claim 15, wherein the batch information consists of information specifying a size of the batch and information specifying the assigned one of the distributed workload parser circuits.

* * * * *